United States Patent [19]

Johnstone

[11] Patent Number: 5,066,176
[45] Date of Patent: Nov. 19, 1991

[54] PROBE FOR MACHINE TOOL

[75] Inventor: Richard Johnstone, Brookfield, Wis.

[73] Assignee: Kearney & Trecker Corporation, West Allis, Wis.

[21] Appl. No.: 338,470

[22] Filed: Apr. 14, 1989

Related U.S. Application Data

[63] Continuation of Ser. No. 63,451, Jun. 18, 1987, abandoned.

[51] Int. Cl.[5] .............................................. B23C 1/02
[52] U.S. Cl. ..................................... 409/133; 33/504; 33/558; 33/638; 408/2
[58] Field of Search .............................. 33/556-561, 33/638, 572, 503, 504, 832, 833, 836; 408/1 R, 2, 8; 409/133

[56] References Cited

U.S. PATENT DOCUMENTS

| Re. 30,975 | 6/1982 | Stobbe et al. | 33/561 |
|---|---|---|---|
| 3,191,294 | 6/1965 | Daugherty | 408/2 |
| 3,320,673 | 5/1967 | Larson | 37/556 |
| 3,740,160 | 6/1973 | Kimura et al. | 408/2 |
| 4,221,053 | 9/1980 | Bobel et al. | 33/558 |
| 4,426,177 | 1/1984 | Perry | 408/8 |
| 4,576,069 | 3/1986 | Bazuin | 408/2 |

FOREIGN PATENT DOCUMENTS 0036761  3/1980  Japan ................................ 33/558

Primary Examiner—William A. Cuchlinski, Jr.
Attorney, Agent, or Firm—John R. Benefiel; Raymond J. Eifler

[57] ABSTRACT

A probe device (10) for a machine tool includes a part sensing device (28) attached to the end of a piston rod (26), movable along a cylinder (12) mounted on the machine tool spindle head (14). The rod (26) is attached to a piston (42) that is air actuated to extend or retract the rod (26) to respectively move the sensing device (28) to a part measurement position outside the cylinder (12), or to a protected position within the cylinder. When the device (28) is in its measurement position the spindle had (14) is selectively moved to bring device (28) into contact with a machined part to determine the accuracy of machining.

6 Claims, 2 Drawing Sheets

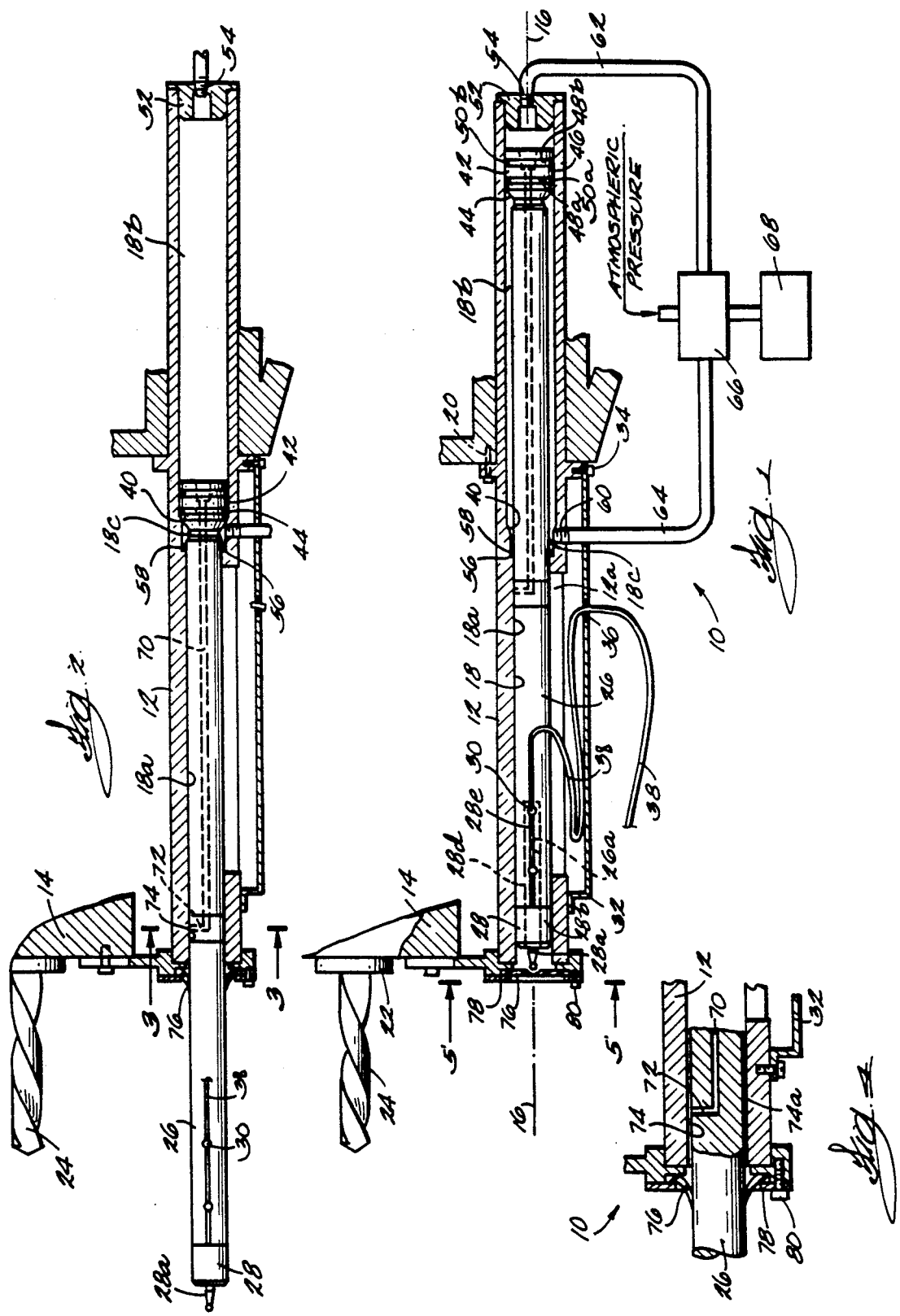

PROBE FOR MACHINE TOOL

This application is a continuation of application Ser. No. 07/063,451, filed June 18, 1987 now abandoned.

BACKGROUND OF THE INVENTION

The invention pertains to a probe for use with a machine tool having a rotary spindle, the probe being of a type which is not mounted in the spindle.

As is well known, contact probe devices are commonly used with machining centers to automatically measure or otherwise inspect a workpiece during the course of machining operations. An important class of such devices is exemplified by U.S. Pat. No. Re. 30,975, issued June 22, 1982, for a "Spindle Probe with Orbital Transformer". Such patent shows an electric circuit contained within a housing mounted on a conventional tool holder. A stylus extends outwardly from the housing which can be displaced or deflected relative to the housing. The stylus is coupled to the circuit so that the circuit will generate electric signals when the stylus is deflected along the X, Y or Z axis of the machining center. Thus, to measure a workpiece which has been machined by a machining center, the device is inserted into the spindle. The spindle is then moved to bring the stylus into contact with machined surfaces of the workpiece to deflect the stylus and thereby generate signals. The position of the stylus along the axes at contact with the workpiece indicates the extent of material removal from the workpiece, and thus indicates the accuracy of the machining operation.

When a device of the above type is used with a machining center to measure or inspect a workpiece, two complete tool transfer operations must be performed by the tool change mechanism of the machining center. One transfer operation is required to move the probe device from the tool storage magazine into the spindle, and the other is required to move the probe from the spindle back to the tool magazine. In some machining centers, a tool transfer operation requires in excess of ten seconds. No machining can be performed during the tool change operations, or while the probe is in the spindle. Also, it is frequently desirable to inspect a workpiece between two machining operations using the same cutting tool. In such situations, it would be very advantageous to allow the tool to remain in the spindle while the inspection was performed. Time required for multiple tool change operations is thereby eliminated. In addition, precision of subsequent machining is likely to be enhanced, since the seating of the tool in the spindle will remain unchanged.

SUMMARY OF THE INVENTION

A probe for use with a machine tool having a rotary spindle mounted in a spindle head includes a cylinder, and means for attaching the cylinder to the spindle head so that the cylinder is in spaced-apart parallel relationship with the spindle. A piston is positioned for reciprocating movement along the bore of the cylinder, and sensing means joined to move with the piston are provided for selectively contacting workpieces associated with the machine tool to generate signals which represent workpiece dimensions. The probe further includes means for retracting the sensing means into the cylinder when machining operations are performed by the machine tool, and for extending the sensing means out from the cylinder to position the sensing means to inspect a workpiece. Preferably, means are included for precisely positioning the sensing means relative to the cylinder, when it is extended, and for thermally isolating the sensing means from surrounding structure. It is anticipated that the probe will be particularly useful in conjunction with machining centers or other machine tools automatically operated in an unattended mode.

An advantage of the invention lies in providing a workpiece inspection probe for use with a machine tool which is mounted for movement with the spindle head, but does not require insertion into the spindle.

Another advantage lies in precisely positioning the probe with respect to the spindle head during workpiece inspection, to enhance accuracy and repeatability in inspecting and machining a succession of workpieces.

Another advantage lies in thermally isolating the probe from the spindle head during workpiece inspection.

Another advantage lies in eliminating the need to perform tool change operations in order to use a workpiece inspection probe with a machining center, and to thus reduce workpiece or part cycle time.

Another advantage lies in providing the capability to inspect a workpiece between two machining operations performed by the same cutting tool engaged in a spindle, without changing the seating relationship between the tool and spindle. Thus, cutting size precision is maintained, finish cuts can be made following measurement of an actual part, and high process predictability can be provided.

These and other advantages will become more readily apparent from the ensuing Detailed Description of the preferred Embodiment, taken together with the Drawings.

BRIEF DESCRIPTION OF THE DRAWINGS

FIG. 1 is a sectional view showing an embodiment of the invention in a retracted mode.

FIG. 2 is a sectional view showing the embodiment of FIG. 1 in an extended mode.

FIG. 4 shows a portion of FIG. 2 in greater detail.

DETAILED DESCRIPTION OF THE PREFERRED EMBODIMENT

Figure 6:
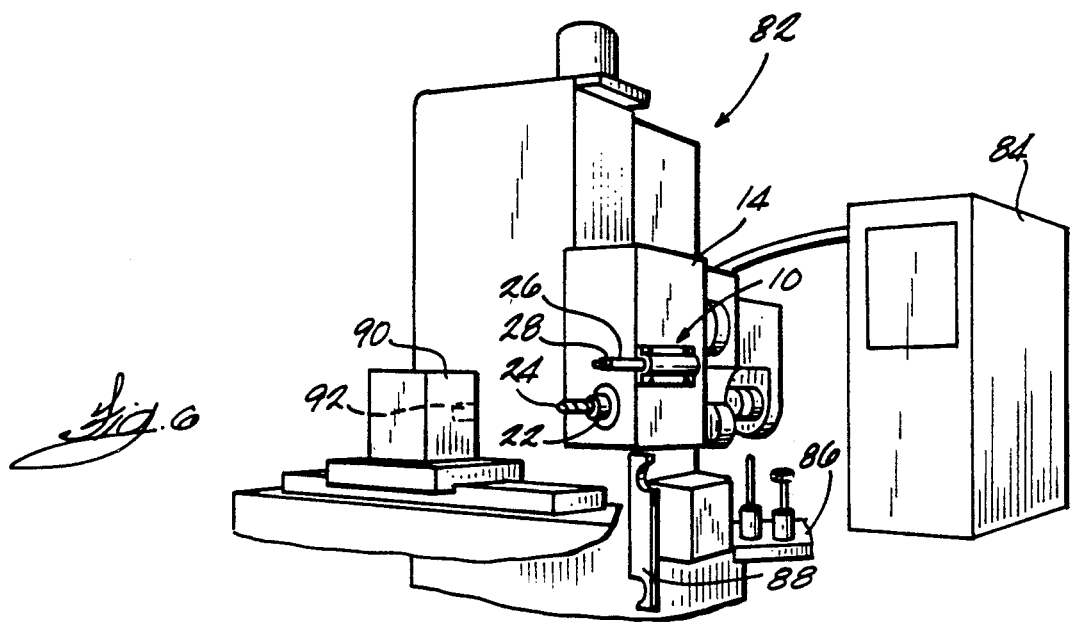
FIG. 6 is a view showing the embodiment of FIG. 1 engaged by a machining center for inspecting a workpiece.

FIG. 1 shows a probe device 10 provided with a cylinder 12, which is attached to a spindle head 14 of a machining center or other machine tool. The bore 18 of cylinder 12 has an axis 16, and cylinder 12 is joined to spindle head 14, such as by bolts 20, to align the bore axis 16 in parallel relationship with the axis of a spindle 22 journaled in the spindle head 14, and of a cutting tool 24 inserted into the spindle for performing machining operations. A piston 42 of circular cross section is mounted for slideable movement along the cylinder bore 18, to selectively retract a piston rod 26 joined to piston 42 into the cylinder or to partially extend the piston rod out from the cylinder. A part inspection device 28 is joined to the end of piston rod 26, and is respectively retracted into or extended out from the cylinder 12 together with piston rod 26. Thus, the cylinder 12 provides a protective housing for device 28.

Inspection device 28 comprises a device of the type described above, in connection with U.S. Pat. No. Re.

30,975. Device 28 thus has a stylus 28a, housing 28b, and an electric circuit contained within the housing 28b (not shown). The stylus is oriented along bore axis 16, and its position is known relative to the spindle. A computer control (not shown in FIG. 1), connected to regulate operation of the machine tool is continually aware of the position of the spindle, in terms of the machine tool coordinates, and is therefore continually aware of the stylus position. To inspect a workpiece, such as to measure the size or position of holes formed therein, piston 42 is actuated to extend piston rod 26 out from cylinder bore 18, as hereinafter described. Device 28 is thereby moved out of the cylinder to a part measurement position. Spindle head 14 is then moved to bring stylus 28a into contact with the workpiece, the contact causing stylus deflection. As previously stated, deflection of the stylus causes the circuit in the housing 28b to generate a signal, and thus provide notice to the controller that contact has occurred.

Device 28 comprises a commercially available device, such as the Model No. TP6 3D probe sold by Renishaw, Ltd. A device of such type includes a shaft 28d extending rearwardly from housing 28b which is fitted into a complementary bore 26a, formed in the forward end of the piston rod 26. Device 28 is thus rigidly attached to piston rod 26, in coaxial relationship. The attachment is maintained by means of screws 30, connecting piston rod 26 and shaft 28d.

Signals generated by device 28 are coupled through conductors 28e in shaft 28d which is connected to a flexible conductor 38b. The flexible conductor 38 passes through a slot 12a formed through the wall of cylinder 12. When piston rod 26 is in its retracted mode, as shown in FIG. 1, flexible conductive member 38 is folded and retained in an enclosure formed by a slot cover 32 joined to cylinder 12, such as by screws 34. Conductive member 38 passes through a port 36 formed through cover 32. Conductive member 38 is connected to the computer control employed to operate the machine tool associated with spindle head 14 and spindle 22. Thus, an electrical path is provided to the computer control for the signals generated by device 28.

Referring further to FIG. 1, there is shown bore 18 of cylinder 12 comprising a forward portion 18a and a rearward portion 18b. The diameter of bore portion 18a is selected to provide only enough clearance between the bore wall of portion 18a and the piston rod 26 to allow the piston rod and sensing device 28 to move freely along portion 18a. In contrast, the diameter of rearward bore portion 18b is selected to provide substantial clearance between the piston rod 26 and bore wall of portion 18b. Bore portion 18b has a taper 40 formed in its bore wall. An annular space 18c is positioned between the smaller diameter of the taper and the bore portion 18a.

FIG. 1 shows piston 42 joined to the rearward end of piston rod 26. A forward portion of piston 42 comprises a taper 44, which matches the taper 40 formed in the wall of the cylinder bore and partially mates with taper 40 when piston rod 26 is fully extended. Annular grooves 48a and 48b are formed in piston 42. O-Rings 50a and 50b are respectively fitted into grooves 48a and 48b, to form an air-tight seal between piston 42 and the wall of cylinder bore portion 18b.

FIG. 1 shows a plug 52 fitted into the rearward end of cylinder 12. The plug provides an air-tight seal at the right end of bore portion 18b, as viewed in FIG. 1, except for a port 54 formed through the plug. Also, an annular recess 56 is formed in the wall of cylinder 12, just to the left of bore portion 18b, as viewed in FIG. 1, to receive an O-ring 58. The O-ring 58 provides an air tight seal between piston rod 26 and cylinder 12. A port 60 is formed through the bore wall, between the taper 44 and O-ring 58, in communication with the space 18c.

To move piston rod 26 and device 28 into and out of cylinder 12, air hoses 62 and 64 are respectively connected between ports 54 and 60, and a valve 66. Valve 66 operates in response to control signals from the computer control of the associated machine tool to selectively couple one of the ports 54 and 60 to an air supply 68, while coupling the other port to atmospheric pressure. Air supply 68 provides air at a pressure level on the order of 30-90 p.s.i., and usefully comprises the source of air pressure commonly found in shops and manufacturing areas. Thus, to move piston rod 26 and device 28 into cylinder 12, that is, from an extended position to a retracted position, as shown in FIG. 1, valve 66 is operated to apply the nominal 50 p.s.i. pressure to port 60, while applying the lesser level of atmospheric pressure to port 54. The air-tight seal between piston 42 and the wall of bore portion 18b, provided by O-rings 50a and 50b, establishes two zones of air pressure within bore portion 18b, one to the left of piston 42 and one to the right, as viewed in FIG. 1. Since the pressure in the leftward zone is greater than the pressure in the rightward zone, the piston 42 is moved to the right, to retract the piston rod and device 28 into cylinder 12.

In like manner, the piston rod 26 and device 28 are extended out of cylinder 12 by operating valve 66 to couple port 54 to the air supply 68 and port 60 to atmospheric pressure. The 50 p.s.i. pressure from supply 68 will urge piston 42 to the left, to bring tapers 40 and 44 into abutting relationship. The air supply 68 remains coupled to port 54 as device 10 is employed to measure workpieces, to hold the piston rod 26 and sensing device 28 very rigidly relative to cylinder 12. The matching tapers 40 and 44, together with other means hereinafter described, act to precisely align the axes of piston rod 26 and device 28 with the axis 16 of cylinder 12.

Figure 3:
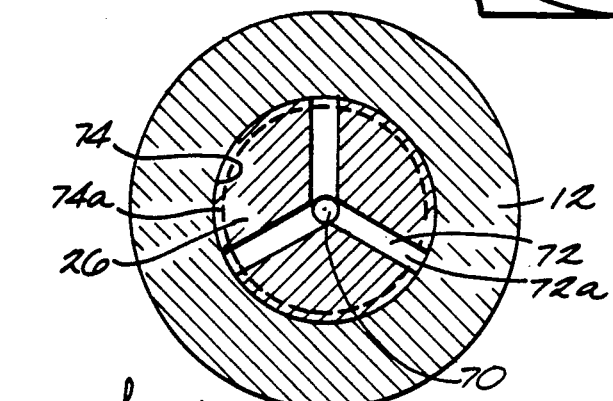
FIG. 3 is a view taken along lines 3—3 of FIG. 2.

FIG. 2 shows piston rod 26 extended to move device 28 outward from cylinder 12 to the part measurement position. Preferably, such position lies beyond the end of tool 24 from the cylinder. A passage 70 is formed through piston 42 and piston rod 26, which is centered along the axes thereof. Passage 70 extends from the rearward end of piston 42 to three holes 72 formed through piston rod 26, in radial relationship therewith. Holes 72 are positioned around the circumference of the piston rod 26, in equidistant relationship with one another as shown in FIG. 3, and extend from the end of passage 70 through the piston rod. The axes 72a of the holes 72 are located at 120° from one another, to a high level of tolerance.

When piston rod 26 is extended to position sensor device 28 as shown in FIG. 2, the holes 72 are brought into alignment with a region 74 of the wall of bore portion 18a. The diameter of the bore in region 74 is made to be minimal, i.e., as small as possible without preventing movement of piston rod 26. Since port 54 remains coupled to air supply 68 when the piston rod is extended as shown in FIG. 2, the air pressure within the bore portion 18b, adjacent to the opening of passage 70, will be at the nominal 50 p.s.i. Air under such pressure moving out of a hole 72 against the bore wall in region 74 will act to urge the piston 26 away from the bore wall. However, because the holes 72 are in equidistant relationship around the circumference of the piston rod 26, the total effect of the air passing through the holes will be to precisely align the axes of device 28 and piston rod 26 with the center of the cylinder bore. Thus, by means of air supply 68, passage 70 and holes 72 in the piston rod, and tapers 40 and 44, the axis of device 28 is made repeatably alignable with cylinder axis 16, whenever the device 28 is extended outward to the measurement position, ensuring reproducible results in part inspection.

FIG. 3 shows holes 72 spaced around piston 26 In addition to providing reproducible results, the holes 72, which cooperatively act to form an air bearing for piston rod 26, thermally isolate piston rod 26 and probe 28 from cylinder 12 and spindle head 14. Thus, temperature variations in such structure do not affect the accuracy of probe 28.

FIG. 4 shows device 10 provided with a seal 76. Seal 76 is held in position by means of a cylinder cover plate 78, joined to the cylinder by means of bolts 80.

Figure 5:
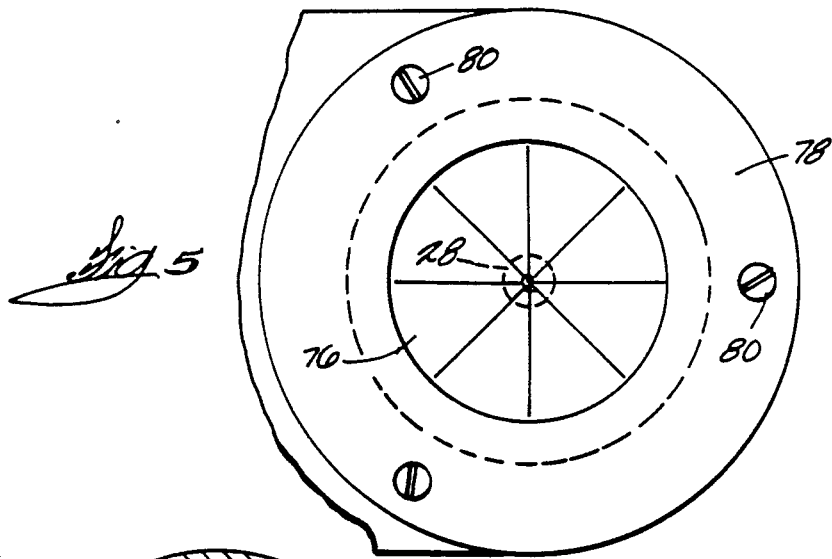
FIG. 5 is a view taken along lines 5—5 of FIG. 1.

FIG. 5 shows seal 76 closed to prevent dirt or other contaminants from entering bore 18 when piston rod 26 is fully retracted thereinto, and to thus protect device 28.

FIG. 6 shows device 10 attached to a machining center 82 having a control 84, a tool storage magazine 86, and a tool change mechanism 88. FIG. 6 further shows device 28 extended out from cylinder 12, for use in performing measurements of a part 90, such as to measure the position and diameter of a hole 92 formed in the part. It is, of course, preferable to locate device 10 as close as possible to the spindle centerline.

It will be understood that in a modification of the invention an enclosure formed in the spindle head 14 could be used to protectably receive the device 28 rather than a cylinder 12 or the like attached to the spindlehead. It is to be understood further that other means besides those shown above could be employed to move sensing device 28 into and out of its protective housing and to precisely locate the sensing device at its measurement position.

What is claimed is:

1. In combination, a workpiece surface measuring probe and a machine tool having a rotary spindle adapted to drive a cutting tool to machine a workpiece, said spindle mounted extending in a direction away from a spindle head, said spindle head movable along coordinate axes of said machine tool, and a controller monitoring the coordinate position of said spindle head along said coordinate axes; mounting means mounting said probe on said spindle head to move therewith, said probe characterized by the improvement comprising sensing means including a stylus and means for generating a signal while said stylus contacts a workpiece surface as said spindle head is moved, and further including means transmitting said signal to said controller to detect the spindle head coordinate position along said coordinate axes when said stylus makes contact with said workpiece surface; said mounting means including an elongated member having said stylus affixed to one end thereof and retracting means selectively retracting said elongated member to position said stylus adjacent said spindle head when said cutting tool is machining said workpiece and extending means extending said elongated member to a fixed, extended position out from said spindle head in the direction in which said spindle extends, whenever said workpiece is to be measured; and, locating means acting on said elongated member to locate said stylus spaced away from said spindle head in a single unique precisely repeatable position with respect to said spindle head whenever said elongated member moves to said extended fixed position, whereby said controller can accomplish coordinate measurements of a workpiece by movement of said spindle head without removal of a cutting tool from said spindle.

2. The combination according to claim 1 wherein said stylus is positioned substantially beyond said cutting tool when in said extended position.

3. The combination according to claim 1 wherein said means selectively retracting said elongated member and said extending means extending said elongated member include a cylinder attached to said spindle head, and wherein said elongated member comprises a piston rod mounted in said cylinder for movement therein, said stylus attached to one end of said piston rod to be moved therewith in moving from said retracted to said extended position.

4. The combination according to claim 3 wherein said locating means includes mating fixed shoulders acting to axially locate the piston rod in said extended position and further including centering means precisely aligning said piston rod in said cylinder when said piston rod is in said extended position.

5. The combination according to claim 4 wherein said centering means includes a circumferential array of equispaced holes in said piston rod and means for directing an air flow therethrough to precisely center said piston rod in said cylinder.

6. The combination according to claim 3 wherein said piston rod and said cylinder extend parallel to said spindle.

* * * * *